US007730074B1

(12) United States Patent
Stoutamire (10) Patent No.: US 7,730,074 B1
(45) Date of Patent: Jun. 1, 2010

(54) ACCELERATED LARGE SCALE OPTIMIZATION

(75) Inventor: David Stoutamire, Redwood City, CA (US)

(73) Assignee: Google Inc., Mountain View, CA (US)

( * ) Notice: Subject to any disclaimer, the term of this patent is extended or adjusted under 35 U.S.C. 154(b) by 533 days.

(21) Appl. No.: 11/266,592

(22) Filed: Nov. 4, 2005

(51) Int. Cl.
G06F 7/00 (2006.01)
G06F 17/30 (2006.01)

(52) U.S. Cl. ...................... 707/749; 707/752
(58) Field of Classification Search .............. 707/2, 707/3, 5, 7, 8
See application file for complete search history.

(56) References Cited

U.S. PATENT DOCUMENTS

| | | | | | |
|---|---|---|---|---|---|
| 5,884,077 | A | * | 3/1999 | Suzuki | 718/105 |
| 6,006,222 | A | | 12/1999 | Culliss | 707/5 |
| 6,014,665 | A | | 1/2000 | Culliss | 707/5 |
| 6,078,916 | A | * | 6/2000 | Culliss | 707/5 |
| 6,182,068 | B1 | | 1/2001 | Culliss | 707/5 |
| 6,539,377 | B1 | | 3/2003 | Culliss | 707/5 |
| 7,222,127 | B1 | | 5/2007 | Bem et al. | |
| 7,231,399 | B1 | | 6/2007 | Bem et al. | |
| 2006/0224577 | A1 | * | 10/2006 | Hullender et al. | 707/5 |
| 2007/0044101 | A1 | * | 2/2007 | Suzuki et al. | 718/102 |

OTHER PUBLICATIONS

"Quickly Generating Billion-Record Synthetic Databases," Gray, Jim; Sundaresan, Prakash; Englert, Susanne; Baclawski, Ken; Weinberger, Paul; Proceedings of the 1994 ACM SIGMOD international conference on Management of data; pp. 243-252, 1994.*

Co-pending U.S. Appl. No. 10/712,263; Jeremy Bem et al.; "Targeting Advertisements Based on Predicted Relevance of the Advertisements"; filed Nov. 14, 2003, 40 pages.

Co-pending U.S. Appl. No. 10/734,584; Jeremy Bem et al.; "Large Scale Machine Learning Systems and Methods"; filed Dec. 15, 2003, 35 pages.

J.H. Friedman, T. Hastie, and R. Tibshirani; "Additive Logistic Regression: a Statistical View of Boosting"; Dept. of Statistics, Stanford University Technical Report; Aug. 20, 1998.

A.Y. Ng and M.I. Jordan; "On Discriminative vs. Generative classifiers: A comparison of logistic regression and naïve Bayes," in T. Dietterich, S. Becker and Z. Ghahramani (eds.), Advances in Neural Information Processing Systems 14, Cambridge, MA: MIT Press, 2002.

F. Crestani, M. Lalmas, C. Van Rijsbergen and I. Campbell; "'Is This Document Relevant?... Probably": A Survey of Probabilistic Models in Information Retrieval"; ACM Computing Surveys, vol. 30, No. 4, Dec. 1998.

Justin Boyan et al.; "A Machine Learning Architecture for Optimizing Web Search Engines"; Carnegie Mellon University; May 10, 1996; pp. 1-8.

"Click Popularity—DirectHit Technology Overview"; http://www.searchengines.com/directhit.html; Nov. 10, 2003 (print date); 2 pages.

Co-pending U.S. Appl. No. 10/697,333 entitled "Automatic Completion of Fragments of Text", by Georges R. Harik, et al.; filed Oct. 31, 2003.

* cited by examiner

Primary Examiner—James Trujillo
Assistant Examiner—Bruce M Moser
(74) Attorney, Agent, or Firm—Harrity & Harrity, LLP (57) ABSTRACT

A method for efficiently choosing optimal weights in a distributed manner may include optimizing weights in a predefined order while preventing or reducing the likelihood that interacting weights are concurrently optimized. In this manner, divergence and deadlock during optimization may be avoided.

25 Claims, 7 Drawing Sheets

ACCELERATED LARGE SCALE OPTIMIZATION

BACKGROUND OF THE INVENTION

1. Field of the Invention

The present invention relates generally to efficiently optimizing multivariate functions created from large data sets and, more particularly, to systems and methods for efficiently optimizing very large logistic regression models used in a ranking function used to rank documents.

2. Description of Related Art

Generally speaking, search engines attempt to return hyperlinks to relevant web documents in which a user may be interested. Search engines may base their determination of the documents' relevancy on search terms (called a search query) entered by the user as well as additional non-query related features such as geographical location, language, etc. The goal of the search engine is to provide links to high quality, relevant results to the user based on the search query and additional information. Typically, the search engine accomplishes this by matching the terms in the search query to a corpus of pre-stored web documents. Web documents that contain the user's search terms are "hits" and are returned to the user. The search engine often ranks the documents using a ranking function based on the documents' perceived relevance to the user's search terms. Optimization techniques may be employed in determining this ranking function.

Efficiently optimizing models of large amounts of information however, such as data on the World Wide Web ("web"), is a challenging task. One requirement for such optimizations is that the resulting optimization converge rather that diverge. Unfortunately, it has been found that, for certain optimization tasks, variables to be optimized share some relationship or interaction with one or more additional variables. Accordingly, convergence of such tasks may only be guaranteed when the variables are optimized one at a time, so as to eliminate the possibility of divergence.

For very sparse problems, one can optimize non-interacting variables concurrently. However, this approach does not work well when the optimization is distributed. Additionally, naive implementations may optimize a small number of weights at once, controlled by a parameter. This approach can work for specific settings of the parameter controlling the number of rules. Unfortunately, it isn't possible to predict what value is right, and a future data may cause divergence. Additionally, because efficiency hinges on the parameter, it tends to be set as high as possible, making the system more likely to fail.

SUMMARY OF THE INVENTION

According to one aspect consistent with principles of the invention, a system for ranking documents is provided. The system may include a repository configured to store training data that includes a group of features called an "instance". A group of distributed devices may be configured to select a current condition that includes one or more of the features associated with an instance, identify a number of other conditions associated with the instances that are currently being optimized, and determine whether the number of other conditions currently being optimized is less than a predetermined value. When it is determined that the number of other conditions currently being optimized is less than a predetermined value, the group of distributed devices may be further configured to estimate a weight for the current condition.

According to a further aspect, a method for optimizing a large data set may include identifying at least one instance in the large data set, the at least one instance including a combination of features. A group of conditions may be identified within the large data set, where each of the group of conditions is a subset of the features included within the at least one instance. A candidate condition associated with a selected instance may be identified. The candidate condition may be assigned to a designated device among a group of devices. It may be determined whether a number of conditions associated with the selected instance being currently optimized by others of the group of devices is less than a predetermined value. A weight associated with the candidate condition may be optimized when it is determined that the number of conditions associated with the selected instance is less than a predetermined value.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with principles of the invention may be used to rapidly optimize large data sets by enabling concurrent or parallel processing of multiple data elements without an undue risk of divergence. In one implementation, the optimized data may be used to generate a ranking model based, at least in part, on prior information retrieval data, such as data relating to users, queries previously provided by these users, documents retrieved based on these queries, and documents that were selected and not selected in relation to these queries.

Exemplary Information Retrieval Network

Figure 1:
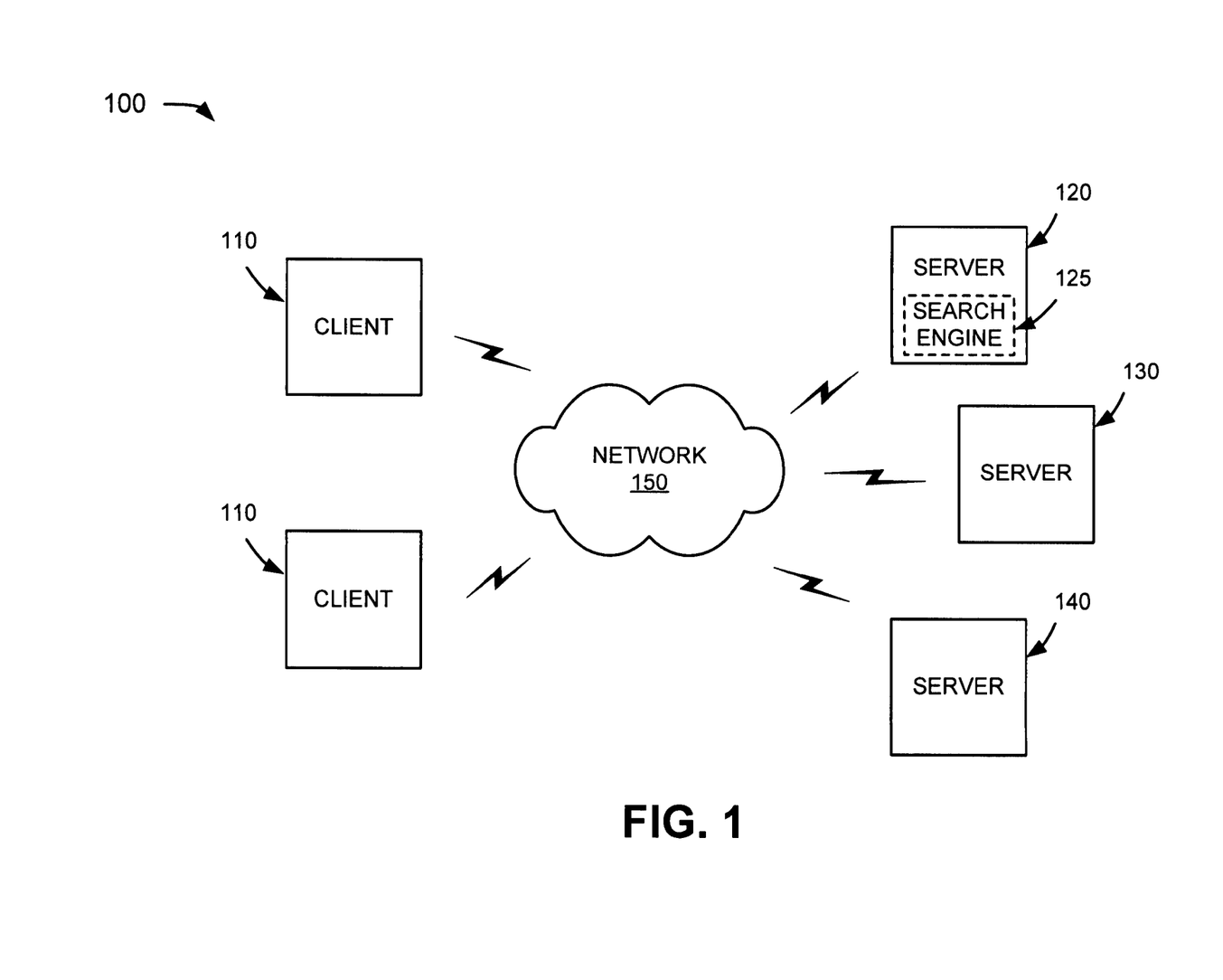
FIG. 1 is a diagram of an exemplary information retrieval network in which systems and methods consistent with principles of the invention may be implemented.

FIG. 1 is an exemplary diagram of a network 100 in which systems and methods consistent with principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with principles of the invention. Clients 110 and servers 120-140 may connect to network 150 via wired, wireless, and/or optical connections.

In an implementation consistent with principles of the invention, server 120 may optionally include a search engine 125 usable by clients 110. Server 120 may crawl documents (e.g., web pages) and store information associated with these documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible that a single one of servers 120-140 is implemented as multiple, possibly distributed, devices.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Model Generation System

Figure 2:
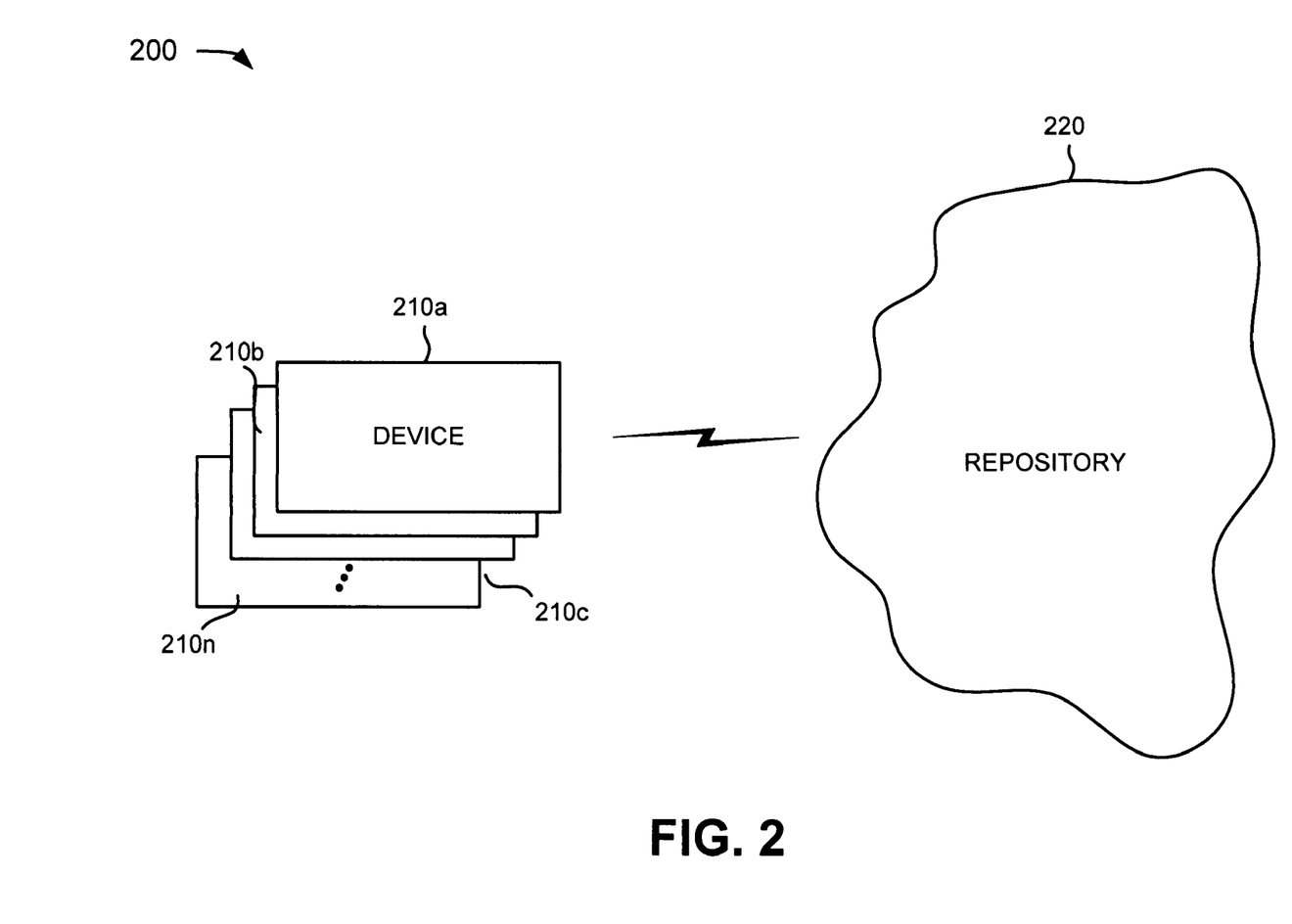
FIG. 2 is a diagram of an exemplary model generation system according to an implementation consistent with principles of the invention.

FIG. 2 is an exemplary diagram of a model generation system 200 consistent with principles of the invention. System 200 may include devices 210a, 210b, 210c, and 210n (collectively, "devices 210") and a repository 220. Repository 220 may include one or more logical or physical memory devices that may store a large data set (e.g., tens of millions of instances and millions of features) that may be used, as described in more detail below, to create and train a ranking model. The data may include information retrieval data, such as query data, user information, and document information, that may be used to create a model that may be used to rank a particular document. The query data may include, for example, search terms previously provided by users to retrieve documents. The user information may include, for example, Internet Protocol (IP) addresses, cookie information, query languages, and/or geographical information associated with the users. The document information may include, for example, information relating to the documents presented to the users and the documents that were selected and not selected by the users. In other exemplary implementations, other types of data may alternatively or additionally be stored by repository 220.

Device(s) 210 may include any type of computing device capable of accessing repository 220 via any type of connection mechanism. According to one implementation consistent with principles of the invention, system 200 may include multiple devices 210. According to another implementation, system 200 may include a single device 210. Device(s) 210 may correspond to or be included within one or more of servers 120-140.

Figure 3:
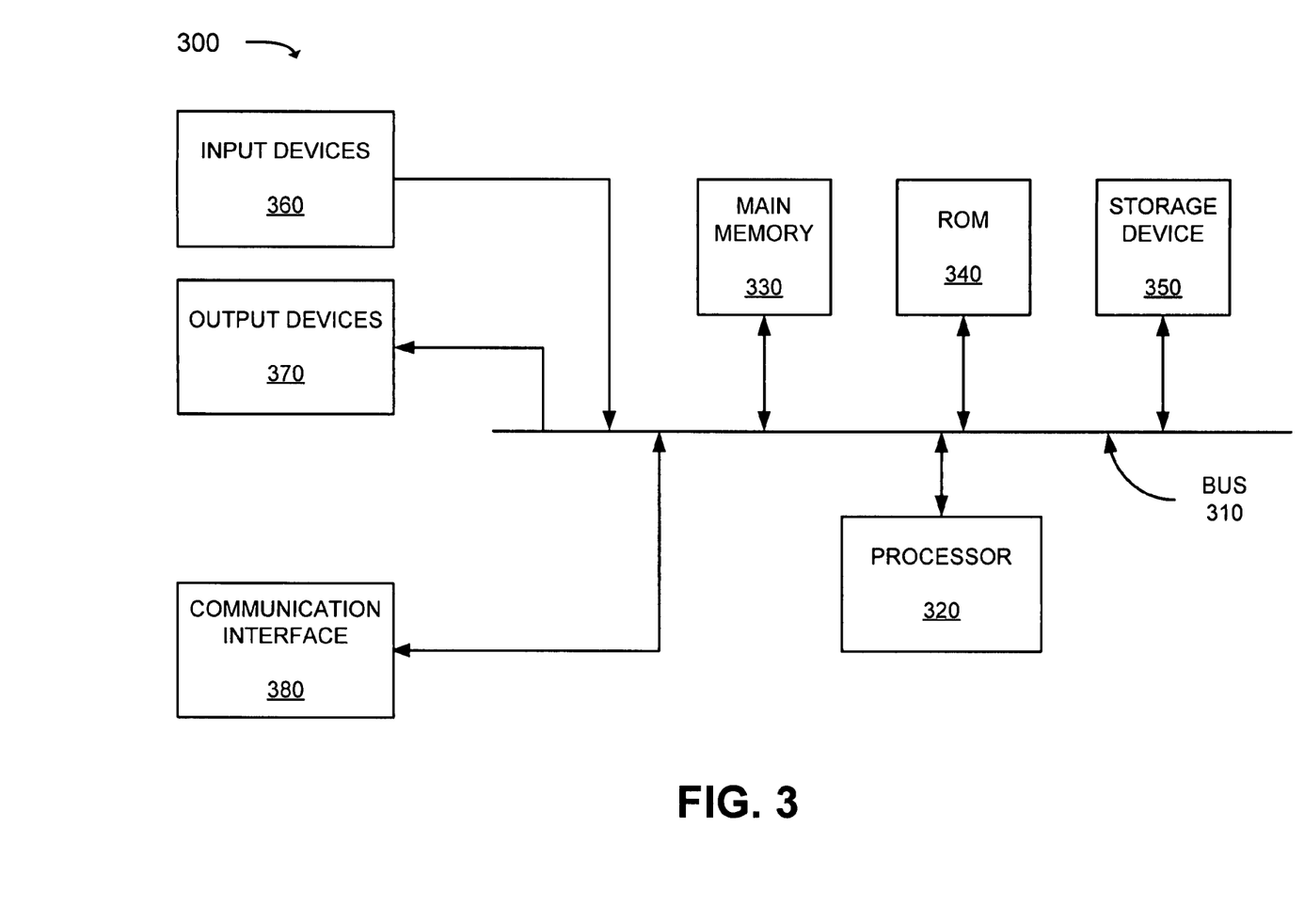
FIG. 3 is an exemplary diagram of a device according to an implementation consistent with principles of the invention.

FIG. 3 is an exemplary diagram of a device 300 according to an implementation consistent with principles of the invention. Device 300 may correspond to one or more of clients 110, servers 120-140, and device(s) 210. Device 300 may include a bus 310, a processor 320, a main memory 330, a read only memory (ROM) 340, a storage device 350, one or more input devices 360, one or more output devices 370, and a communication interface 380. Bus 310 may include one or more conductors that permit communication among the components of device 300.

Processor 320 may include any type of processor or microprocessor that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device(s) 360 may include one or more mechanisms that permit an operator to input information to device 300, such as a keyboard, a mouse, a pen, voice recognition and/or biometric mechanisms, etc. Output device(s) 370 may include one or more mechanisms that output information to the operator, including a display, a printer, a speaker, etc. Communication interface 380 may include any transceiver-like mechanism that enables device 300 to communicate with other devices and/or systems.

As will be described in detail below, device 300, consistent with principles of the invention, may perform certain data-related operations. Device 300 may perform these operations in response to processor 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 causes processor 320 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Model Generation Processing

For purposes of the discussion to follow, the set of data in repository 220 (FIG. 2) may include multiple elements, called instances. It may be possible for repository 220 to store more than 50 million instances. Each instance may include a triple of data: (u, q, d), where u refers to user information, q refers to query data provided by the user, and d refers to document information relating to documents retrieved as a result of the query data and which documents the user selected and did not select.

Several features may be extracted for any given (u, q, d). In one exemplary implementation, these features may include one or more of the following: the country in which user u is located, the time of day that user u provided query q, the language of the country in which user u is located, each of the previous three queries that user u provided, the language of query q, the exact string of query q, the word(s) in query q, the number of words in query q, each of the words in document d, each of the words in the Uniform Resource Locator (URL) of document d, the top level domain in the URL of document d, each of the prefixes of the URL of document d, each of the words in the title of document d, each of the words in the links pointing to document d, each of the words in the title of the documents shown above and below document d for query q, the number of times a word in query q matches a word in document d, the number of times user u has previously accessed document d, and other information. In one implementation, repository 220 may store more than 5 million distinct features.

To facilitate fast identification of correspondence between features and instances, a feature-to-instance index may be generated that links features to the instances in which they are included. For example, for a given feature f, the set of instances that contain that feature may be listed. The list of instances for a feature f is called the "hitlist for feature f." Thereafter, given a set of features $f_0, \ldots, f_n$, the set of instances that contains those features can be determined by intersecting the hitlist for each of the features $f_0, \ldots, f_n$.

Other information may also be determined for a given (u, q, d). This information may include, for example, the position that document d was provided within search results presented to user u for query q, the number of documents above document d that were selected by user u for query q, and a score ("old score") that was assigned to document d for query q. The old score may have been assigned by search engine 125 or by another search engine.

A ranking model may be created from this data. The model uses the data in repository 220 as a way of evaluating how good the model is. The model may include rules that maximize the log likelihood of the data in repository 220. In one implementation consistent with principles of the invention, the model may be a logistic model. The general idea of the model is that, given a new (u, q, d), the model may predict whether user u will select a particular document d for query q. As will be described in more detail below, this information may be used to rank document d for query q and user u.

To facilitate generation of the ranking model, a prior probability of selection may be determined. This "prior" probability of selection may provide the initial probability of document selection without considering any of the features. It uses the position, the old score, and the number of selections of documents above this document.

A set of instances based on the same or a different set of instances may be used as "training data" D. For each instance (u, q, d) in the training data D, its features $(f_0, f_1, \ldots, f_n)$ may be extracted. For example, $f_o$ may be the feature corresponding to "the word 'tree' appears in the query." In this implementation, the feature $f_0$ may include a boolean value, such that if "tree" appears in query q then the value of $f_0$ is one, otherwise the value of $f_0$ is zero. In other implementations, the features may include discrete values. It may be assumed that many of the features will have values of zero. Accordingly, a sparse representation for the features of each instance may be used. In this case, each instance may store only features that have non-zero values. Therefore, for each instance (u, q, d), the following information is available: 1.) its set of features, 2.) whether document d was selected by user u for query q, and 3.) its prior probability of selection.

A "condition" C is a conjunction of various features and possibly their complements. For example, a condition that includes two distinct features may be: "tree" is in query q and the domain of document d is "trees.com." Further, an exemplary condition that includes a feature and a complement of a feature may be: "football" is in query q and the user did not provide the query from "www.google.co.uk." Accordingly, for a given instance (u, q, d), the value of its features may determine the set of conditions C that apply to the instance.

In addition to conditions and features, a "rule" may be defined by a condition C and a weight w, represented as (C, w). The ranking model M may include a set of rules (e.g., $(C_1, w_1), (C_2, w_2)$, etc.) and a prior probability of selection. To generate the model M the values of the weights $w_1, \ldots, w_n$ need to first be determined. Based on this information, a function may be created that maps the set of conditions to a probability of selection.

To generate the model M, processing may start with an empty model M that includes the prior probability of selection. A candidate condition C may initially be selected. In one implementation, candidate conditions may be selected from the training data D. For example, for each instance in the training data D, combinations of features that are present in that instance (or, alternatively, complements of these features) may be chosen as candidate conditions. In another implementation, random sets of conditions may be selected as candidate conditions. In yet another implementation, single feature conditions may be considered for candidate conditions. In a further implementation, existing conditions in the model M may be augmented by adding extra features and these augmented conditions may be considered as candidate conditions.

A weight w for condition C may then be estimated. The weight w may be estimated by attempting to maximize a function of the training data D and the model M, such as the log likelihood of the training data D given the model M augmented with rule (C, w)—that is, find the weight that maximizes Log P(D|M, (C, w)), where "M, (C, w)" denotes the model M with rule (C, w) added if condition C is not already part of the model M, and w is the weight for condition C.

Large Data Sets

Figure 4:
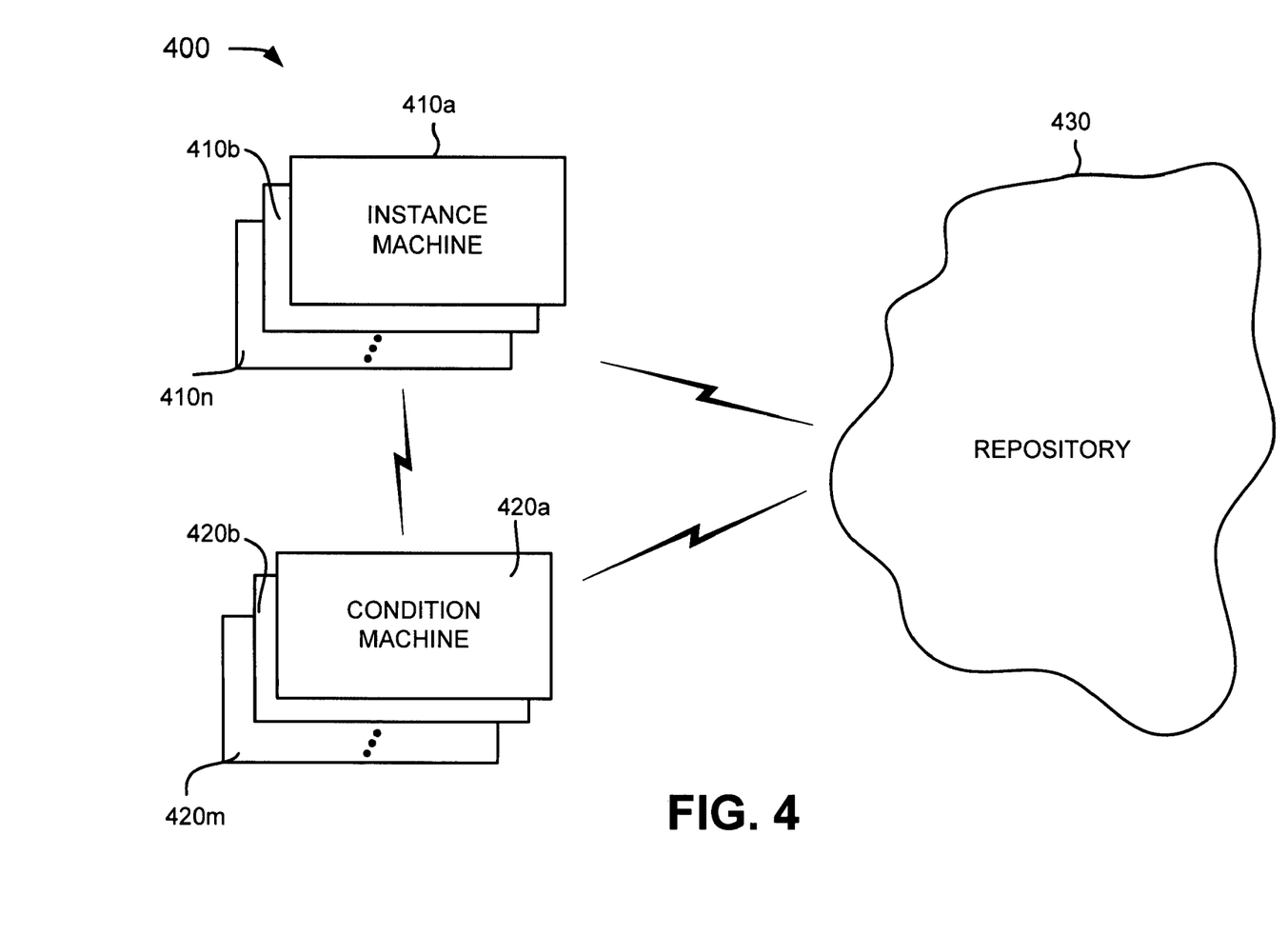
FIG. 4 is a diagram of another exemplary model generation system according to an implementation consistent with principles of the invention.

FIG. 4 is an exemplary diagram of a model generation system 400 consistent with principles of the invention. System 400, as with system 200 described above, may include devices 410*a*, 410*b*, and 410*n* (collectively, "devices 410"), devices 420*a*, 420*b*, and 420*m* (collectively, "devices 420"), and a repository 430. Devices 410-420 and repository 430 are substantially similar in function to devices 210 and repository 220 described above. When the data set within repository 430 becomes very large (e.g., substantially more than a few million instances), devices 410 and devices 420 may be configured as a distributed system. It should be fully understood that devices 410 and 420 may, in fact, represent multiple physical machines or may represent multiple processing threads or other types of parallel processing performed on a single or smaller number of physical machines. For example, devices 410 and 420 may be capable of communicating with each other and with repository 430, as illustrated in FIG. 4.

Unfortunately, as multiple devices 410 and 420 become responsible for handling or otherwise contributing to the generation of model M, it may be possible for various candidate conditions to be correlated in such a manner that parallel processing of the conditions may deadlock and fail to result in an accurate optimization of the conditions, and hence, the model as a whole. In such a circumstance, the deadlock may be caused by interdependencies between the conditions that may prevent the necessary optimization and may result in eventual divergence of the model. In accordance with one implementation consistent with principles of the invention, such correlated conditions may be adequately addressed, such that an optimized model is created and deadlock may be avoided.

According to one exemplary implementation of the distributed system, devices 410 (e.g., "instance machines") may each be responsible for a subset of the instances within repository 430. Each instance machine 410 may possibly store its subset of instances in local memory. Additionally, devices 420 (e.g., "condition machines") may be responsible for optimizing the various candidate conditions that may apply to each instance and returning the optimized results to instance machines 410. In one embodiment, each device 410 and 420 may build its own feature-to-instance index for its subset of instances or conditions.

Figure 5:
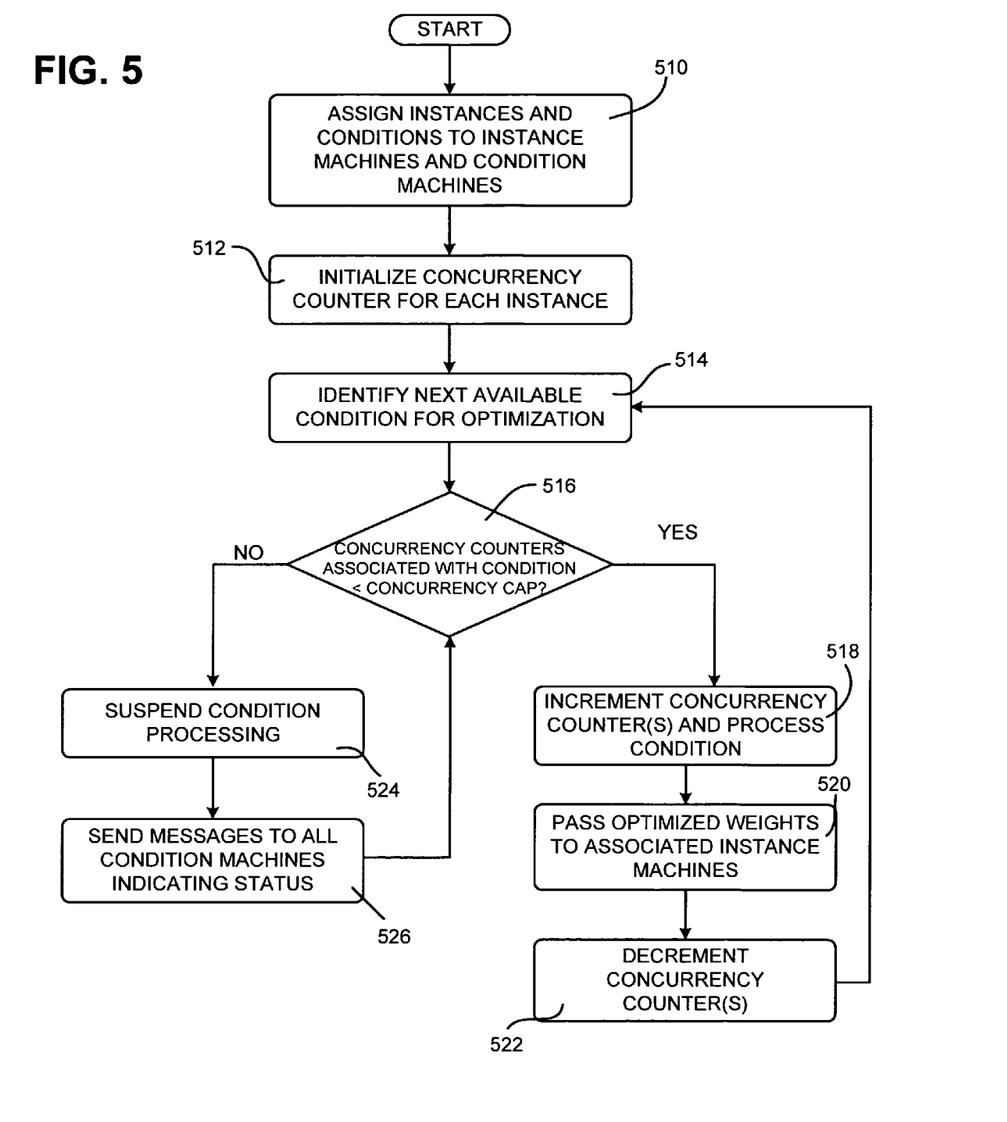
FIG. 5 is a flowchart of exemplary processing for generating a ranking model according to another implementation consistent with principles of the invention.

As described above, each instance (u, q, d) in repository 430 may include or correspond to one or more features. Additionally, each instance may have one or more conditions that apply to it, where the conditions relate to features or combinations of features found in the instance. FIG. 5 is a flowchart of exemplary processing for generating a ranking model according to an implementation consistent with principles of the invention. Initially, processing may begin by assigning each instance to one of the instance machines 410 and assigning each condition to one of the condition machines 420 in a sorted manner (act 510). It should be noted that multiple instances may be assigned to a single instance machine 410 and multiple conditions may be assigned to a single condition machine 420.

Once the instances and conditions have been assigned, processing of the various instances and conditions may begin. Initially, for each instance being processed, a concurrency counter may be initialized indicating the number of concurrently processed conditions depending on the instance (act 512). A next available condition may then be identified for optimization (act 514). Prior to optimizing the identified condition, the concurrency counters associated with each instance related to the condition are checked to determine whether they are each less than a maximum concurrency cap (act 516). Because each condition to be optimized may be associated with multiple instances, multiple concurrency counters may need to be examined. In one exemplary implementation, such a concurrency cap may be 2. However, it should be noted that divergence of optimized data may be completely avoided by setting the cap equal to 1. In this case, the conditions associated with each instance are processed one at a time. Increases to the concurrency cap aid in enabling concurrent processing of conditions. Such concurrent processing increases the speed in which the optimization is completed. However, such increased concurrency may result in an increased risk of divergence.

If it is determined that the concurrency counter for any instance associated with the current condition is less than the concurrency cap, the concurrency counter associated with each relevant instance is incremented and the weight associated with the current condition is optimized in the manner set forth above in FIG. 4 (act 518). Upon completion of the optimization, optimized weights are passed to instance machines 410 responsible for the associated instances (act 520). Upon receipt of optimized weights, the associated concurrency counters at instance machines 410 may be decremented (act 522). The process then returns to act 514 for processing of the next available condition.

If it is determined that a concurrency counter for any instance associated with the current condition is not less than the concurrency cap, optimization of the models associated with the current condition may be suspended (act 524). Upon suspension of processing, a message may be sent to each condition machine 420 indicating that processing of the current condition has been blocked at the associated instance machine 410 (act 526). The message and any processing to create it may be at low priority.

This notification serves to inform each condition machine 420 that all conditions prior to the current condition in the sorted list of conditions have either been processed by the instance machine 410 sending the message or are not associated with the instance being processed by the instance machine 410 sending the message. Accordingly, any other instance machine waiting for input from the condition machine sending the message relating to a condition below the current condition may determine the message to be an indication that the instance machine sending the message is not providing information regarding any other condition. The process then returns to act 516 where it is again determined whether the applicable concurrency counters are at least one less than the concurrency cap. As described above, return of optimized values for conditions serve to decrement the concurrency counters associated with the condition currently being processed. As should be clear from the above description, adherence to the concurrency cap significantly reduces the likelihood that the processing of correlated or interacting conditions may result in an optimization deadlock.

It should be noted that determining whether applicable counters are at least one less than the concurrency cap (act 516) may be performed concurrently with the act of sending messages indicating that processing of the current condition has been blocked (act 526). Moreover, sending messages indicating that processing of the current condition has been blocked may cease as soon as applicable counters are less than the concurrency cap.

Consider the following example: model generation system 400 includes two instance machines 410*a* and 410*b*, two condition machines 420*a* and 420*b*, and a repository 430 containing data having the following features: f1=(query contains: "thanks"); f2=(query is in English); f3=(query contains: "abrigado"); and f4=(query is in Portuguese). Further consider that a first instance i1 includes features f1 and f2 and is assigned to instance machine 410*a* and a second instance i2 includes features f3 and f4 and is assigned to instance machine 410*b*. Further, four feature-specific candidate conditions are identified, where condition c1=feature f1 and is assigned to condition machine 420*a*; condition c2=feature f3 and is assigned to condition machine 420*b*; condition c3=feature f2 and is assigned to condition machine 420*a*; and condition c4=feature f4 and is assigned to condition machine 420*b*. In this example, conditions c1 and c3 apply to instance i1 and conditions c2 and c4 apply to instance i2. As noted by the feature definitions, conditions c1 and c3 may be considered correlated in that each condition depends from or applies to instance i1. Similarly, conditions c2 and c4 may be considered correlated in that each condition depends from or applies to instance i2. Further, assume that the concurrency cap for this example is 1, meaning that no more than one condition relating to an instance may be optimized at any one time.

Figure 6:
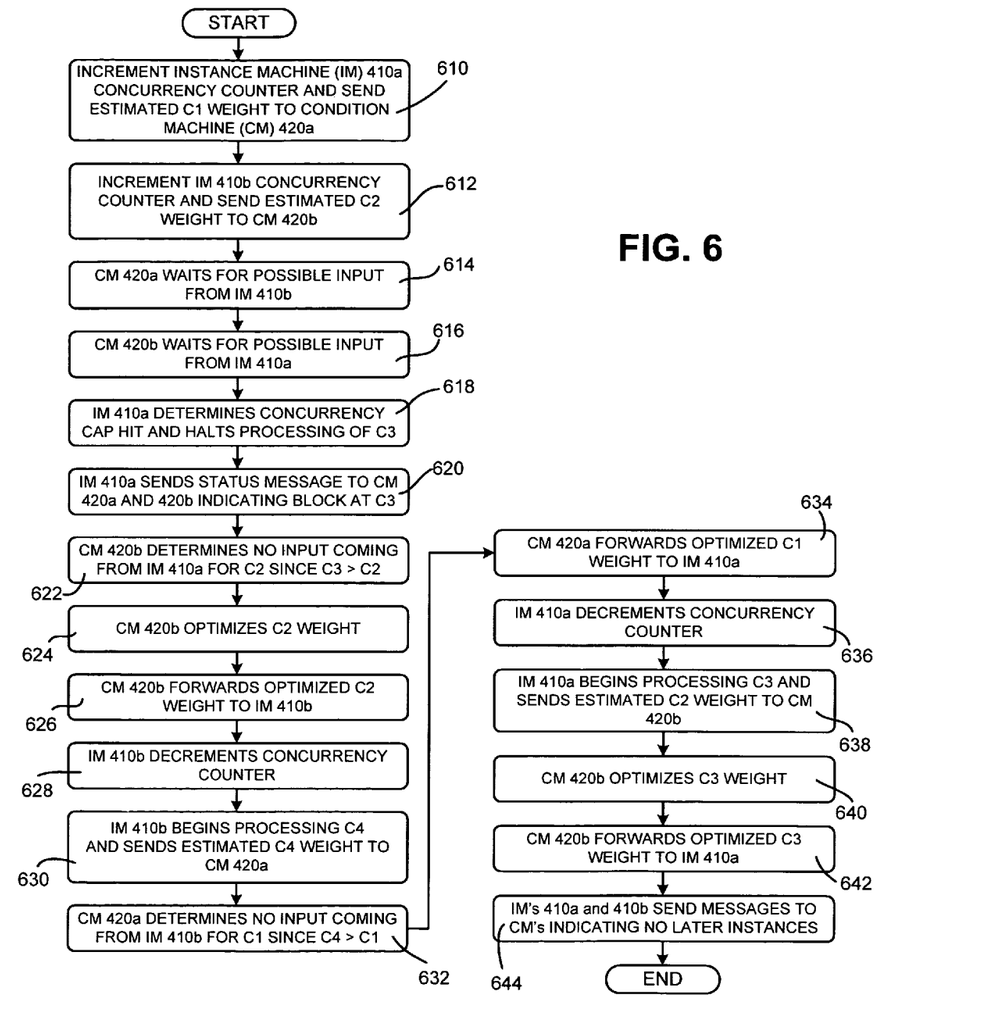
FIG. 6 is a flowchart of exemplary processing for concurrently optimizing data according to yet another implementation consistent with principles of the invention.

FIG. 6 is a flow chart of exemplary processing for generating a concurrently optimizing data in the system 400 of the present example. Initially, instance machine 410a begins by incrementing its concurrency counter to 1 and processing condition c1, resulting in instance machine 410a sending information for optimizing condition c1 to condition machine 420a responsible for optimizing condition c1 (act 610). Next, instance machine 410b begins incrementing its concurrency counter to 1 and sending information for optimizing condition c2 to condition machine 420b responsible for optimizing condition c2 (act 612).

Upon receipt of the information for optimizing condition c1 from instance machine 410a, condition machine 420a waits to perform optimization of c1 until it hears from instance machine 410b, in case the instance under process by instance machine 410b also applies to instance c1 (act 614). Similarly, upon receipt of the information for optimizing condition c2 from instance machine 410b, condition machine 420b waits to perform optimization of c2 until it hears from instance machine 410a, in case the instance under process by instance machine 410a also applies to instance c2 (act 616).

At this point, while instance machine 410a awaits an optimized weight for condition c1, it considers processing condition c3. However, instance machine 410a determines that the concurrency cap for instance i1 has been reached, since condition c1 also associated with instance i1 is currently being optimized (act 618). Accordingly, as described above, instance machine 410a sends a message to condition machines 420a and 420b indicating that it is blocked at condition c3 (act 620).

Upon receipt of this message, condition machine 420b determines that it no longer needs to wait for input from instance machine 410a relating to condition c2, since c3 (the current stopping point) is greater than (i.e., after) condition c2 (act 622). Accordingly, condition machine 420b then finalizes optimization of condition c2 (act 624) and sends its optimized weight back to instance machine 410b (act 626).

Upon receipt of the optimized weight for condition c2 the concurrency counter is decremented (act 628). Instance machine 410b then processes the next available condition c4 associated with its instance i2 by sending an information for optimizing condition c4 to condition machine 420a responsible for optimizing condition c4 (act 630). Condition machine 420a then determines that it no longer needs to wait for instance machine 410b to process condition c1 and finalizes optimization of condition c1 since condition c4 is greater than (i.e., after) condition c1 and that condition c1 is associated with instance machine 410a (act 632). Condition machine 420a then sends an optimized weight for condition c1 back to instance machine 410a (act 634). Upon receipt of the optimized weight for condition c1 the concurrency counter associated with instance i1 is decremented (act 636).

Upon decrementing the concurrency counter associated with instance i1, condition machine 410a is unblocked regarding condition c3. Information for optimizing condition c3 is then sent to condition machine 420b (act 638). Condition machine 420b processes condition c3 and finalizes optimization of condition c3 (act 640). Condition machine 420b then sends an optimized weight for condition c3 back to instance machine 410a (act 642). It should be noted that condition c4 must wait until it is determined whether instance machine 410a has any instances to which condition c4 may apply. This determination is made upon receipt of a message about condition c4 from instance machine 410a or a message from instance machine 410a regarding a later condition. As discussed above, a message regarding a later condition indicates that instance machine 410a does not apply to condition c4 and that processing may continue.

In this example, instance machine 410a does not affect condition c4 and there are no late instances. Accordingly, instance machines 410a and 410b send a message to condition machines 420a and 420b indicating that they have no more instances (act 644). In this way, any remaining conditions may be optimized.

Exemplary Process for Ranking Documents

Figure 7:
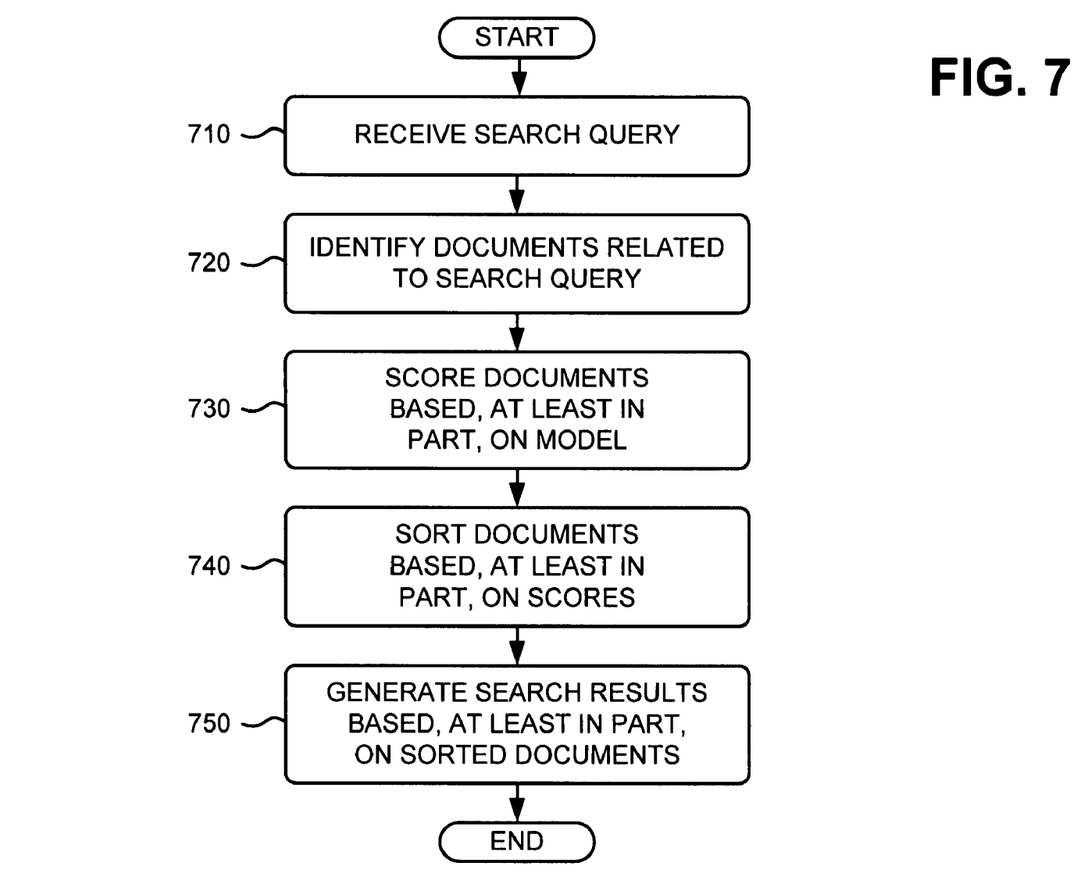
FIG. 7 is a flowchart of exemplary processing for ranking documents according to an implementation consistent with principles of the invention.

FIG. 7 is a flowchart of exemplary processing for ranking documents according to an implementation consistent with principles of the invention. Processing may begin with a user providing one or more search terms as a search query for searching a document corpus. In one implementation, the document corpus is the Internet and the vehicle for searching this corpus is a search engine, such as search engine 125 (FIG. 1). The user may provide the search query to search engine 125 via web browser software on a client, such as client 110 (FIG. 1).

Search engine 125 may receive the search query and act upon it to identify documents (e.g., web pages) related to the search query (acts 710 and 720). A number of techniques exist for identifying documents related to a search query. One such technique might include identifying documents that contain the one or more search terms as a phrase. Another technique might include identifying documents that contain the one or more search terms, but not necessarily together. Other techniques might include identifying documents that contain less than all of the one or more search terms, or synonyms of the one or more search terms. Yet other techniques are known to those skilled in the art.

Search engine 125 may then score the documents based on the ranking model described above (act 730). With regard to each document, search engine 125 may identify a new instance (u, q, d) that corresponds to this user search, where u refers to the user, q refers to the search query provided by the user, and d refers to the document under consideration. Search engine 125 may extract the features from the new instance and determine which rules of the ranking model apply. Search engine 125 may then combine the weight of each rule with the prior probability of selection for (u, q, d) to determine the final posterior probability of the user u selecting this document d for query q. Search engine 125 may use the final posterior probability as the score for the document. Alternatively, search engine 125 might use the final posterior probability as one of multiple factors in determining the score of the document.

Search engine 125 may sort the documents based on their scores (act 740). Search engine 125 may then formulate search results based on the sorted documents (act 750). In an implementation consistent with principles of the invention, the search results may include references to the documents, such as links to the documents and possibly a textual description of the links. In another implementation, the search results may include the documents themselves. In yet other implementations, the search results may take other forms.

Search engine 125 may provide the search results as a HyperText Markup Language (HTML) document, similar to search results provided by conventional search engines.

Alternatively, search engine 125 may provide the search results according to a protocol agreed upon by search engine 125 and client 110 (e.g., Extensible Markup Language (XML)).

Search engine 125 may further provide information concerning the user, the query provided by the user, and the documents provided to the user to help improve the ranking model. For example, server 120 may store this information in repository 220 (or repository 430) or provide it to one of devices 210 (or devices 410 and/or 420) to be used as training data for training the model.

CONCLUSION

Systems and methods consistent with principles of the invention may facilitate functions. In one implementation consistent with principles of the invention, a concurrency counter or counters may be used to limit the number of concurrently optimized variables.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5-7, the order of the acts may be modified in other implementations consistent with principles of the invention. Also, non-dependent acts may be performed in parallel. Further, the acts may be modified in other ways.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for optimizing stored data, performed by one or more server devices, the method comprising:

initiating, by a processor associated with the one or more server devices, optimization of at least one condition associated with the stored data;

selecting, by a processor associated with the one or more server devices, a concurrency cap, where the concurrency cap is selected to reduce optimization divergence among a plurality of devices;

determining, by a processor associated with the one or more server devices, that a concurrency counter is greater than or equal to the concurrency cap, where the concurrency counter is a measure of a number of other conditions associated with the stored data that are undergoing optimization;

halting, by a processor associated with the one or more server devices, the optimization of the at least one condition based on determining that the concurrency counter is greater than or equal to the concurrency cap;

decrementing, by a processor associated with the one or more server devices, the concurrency counter based on completing optimization of one of the other conditions associated with the stored data; and resuming, by a processor associated with the one or more server devices, the optimization of the at least one condition if the concurrency counter, after the decrementing, is less than the concurrency cap.

2. The method of claim 1, where the stored data is associated with a plurality of prior searches.

3. The method of claim 2, where the at least one condition and the other conditions include one or more features, where the one or more features comprise at least one of user information corresponding to users who provided search queries, query data corresponding to the search queries, or document information corresponding to documents relating to the search queries.

4. The method of claim 1, where the at least one condition and the other conditions identify one or more features present within the stored data.

5. The method of claim 4, further comprising:

identifying instances within the stored data, where the instances include one or more of the features; and associating the at least one condition and the other conditions with one or more of the instances.

6. The method of claim 5, further comprising:

determining a number of conditions, that are associated with a selected instance, currently being optimized.

7. The method of claim 5, where the at least one condition and the other conditions are associated with more than one instance, the method comprising:

identifying at least one instance associated with the at least one condition;

determining a number of conditions that are currently being optimized for the at least one instance associated with the at least one condition; and assigning a value to the concurrency counter based on the determined number of conditions.

8. The method of claim 1, further comprising:

incrementing the concurrency counter by one based on initiating optimization of a condition associated with the stored data.

9. The method of claim 1, where the at least one condition and the other conditions are sequentially processed in a sorted order.

10. The method of claim 1, further comprising:

assigning at least one instance to an instance machine;

assigning the at least one condition and the other conditions to a plurality of condition machines; and associating at least some of the at least one condition and the other conditions with at least one instance, where optimization of conditions is performed by respective condition machines.

11. The method of claim 10, further comprising:

notifying the plurality of condition machines that processing is blocked for the at least one condition in response to halting the optimization of the at least one condition.

12. The method of claim 10, further comprising:

computing a weight based on completing optimization of a particular condition; and returning the weight associated with the optimized particular condition to an instance machine associated with an instance comprising the particular condition; and generating a ranking model associated with the instance comprising the particular condition, where the ranking model is based on the returned weight associated with the optimized particular condition.

13. The method of claim 1, where the stored data comprises a data set including millions of features.

14. A system for generating a model, comprising:
a repository to store training data that includes a plurality of features; and
a plurality of distributed devices to:
   select a candidate condition that includes one or more features associated with an instance of the training data, where the instance of training data includes information relating a particular user, information relating to a particular query submitted by the particular user, and information relating to a particular document retrieved based on the particular query;
   identify a number of other conditions associated with the instance that are currently being optimized based on a concurrency counter,
   select a concurrency cap that reduces optimization divergence among the plurality of distributed devices;
   determine whether the number of other conditions currently being optimized is less than the concurrency cap, and
   where, based on determining that the number of other conditions currently being optimized is less than the concurrency cap, the plurality of distributed devices is to:
      estimate a weight for the candidate condition,
      form a new rule based on the candidate condition and the weight,
      compare a model that includes the new rule to a model that does not include the new rule, and
      selectively add the new rule to the model that does not include the new rule based, at least in part, on a result of the comparison.

15. The system of claim 14, the one or more devices further to:
repeat the selecting a candidate condition, identifying a number, determining whether the number is less than a predetermined value, estimating a weight, forming a new rule, comparing a model that includes the new rule to the model that does not include the new rule, and selectively adding the new rule for a number of iterations.

16. The system of claim 14, where, based on determining that the number of other conditions currently being optimized is less than a predetermined value, the plurality of distributed devices is further to increment the number of other conditions by one prior to estimating the weight.

17. The system of claim 14, where based on determining that the number of other conditions currently being optimized is not less than a predetermined value, the plurality of distributed devices further to:
notify each other one of the distributed devices that processing is blocked for the candidate condition.

18. A method of optimizing a data set, performed by one or more server devices, the method comprising:
selecting, by a processor associated with the one or more server devices, at least one instance in the data set, the at least one instance including a combination of features;
selecting, by a processor associated with the one or more server devices, a concurrency cap that reduces optimization divergence among a plurality of devices;
identifying, by a processor associated with the one or more server devices, a plurality of conditions associated with the at least one selected instance;
identifying, by a processor associated with the one or more server devices, a candidate condition associated with the at least one selected instance;
assigning, by a processor associated with the one or more server devices, the candidate condition to a designated device among the plurality of devices;
determining, by a processor associated with the one or more server devices, whether a concurrency counter associated with the at least one selected instance is less than a concurrency cap, where the concurrency counter is a measure of a number of conditions associated with the at least one selected instance that are concurrently being optimized; and
optimizing, by a processor associated with the one or more server devices, a weight associated with the candidate condition based on determining that the concurrency counter is less than the concurrency cap.

19. The method of claim 18, further comprising:
notifying others of the plurality of devices that the designated device is blocked at the candidate condition based on the concurrency counter being not less than the concurrency cap.

20. One or more memory devices containing instructions for controlling at least one processor to perform a method for optimizing stored data, the one or more memory devices comprising:
one or more instructions to initiating initialize optimization of at least one condition associated with the stored data;
one or more instructions to determining determine a number of correlated conditions that are currently being optimized, based on a concurrency counter;
one or more instructions to select a concurrency cap, where the concurrency cap is selected to reduce optimization divergence among a plurality of devices;
one or more instructions to halting halt the optimization of the at least one condition based on the concurrency counter being greater than or equal to the concurrency cap;
one or more instructions to determining determine that the concurrency counter is less than the concurrency cap; and
one or more instructions to resume the optimization of the at least one condition based on the determining that the concurrency counter is less than the concurrency cap.

21. The one or more memory devices of claim 20, where the candidate condition and the number of conditions associated with the selected instance identify one or more features present within the stored data.

22. The one or more memory devices of claim 21, further comprising:
one or more instructions to identify instances within the stored data, where the instances include one or more of the features; and
one or more instructions to associate the candidate condition and the number of conditions associated with the candidate condition with one or more of the instances.

23. A computer-implemented system, comprising:
one or more devices comprising:
means for selecting the at least one instance;
means for identifying a candidate condition associated with the selected instance;
means for initiating optimization of a weight associated with the candidate condition;

means for selecting a particular value, where the particular value is selected to reduce optimization divergence among a plurality of devices;
means for determining whether a number of conditions associated with the selected instance being currently optimized by the plurality of devices is less than the particular value;
means for halting the optimization of the weight, based on the number of conditions associated with the selected instance being currently optimized being greater than or equal to the particular value; and
means for continuing the optimization of the weight, based on the number of conditions associated with the selected instance currently being optimized being less than the particular value.

24. The system of claim 23, further comprising:
means for assigning the candidate condition to a designated device among the plurality of devices; and
means for notifying other ones of the plurality of devices regarding the optimized weight associated with the candidate condition.

25. The system of claim 24, further comprising:
means for notifying other ones of the plurality of devices that the weight associated with the candidate condition has not been optimized, based on the halting the optimization.

\* \* \* \* \*

UNITED STATES PATENT AND TRADEMARK OFFICE
CERTIFICATE OF CORRECTION

PATENT NO. : 7,730,074 B2  Page 1 of 1
APPLICATION NO. : 11/266592
DATED : June 1, 2010
INVENTOR(S) : David Stoutamire It is certified that error appears in the above-identified patent and that said Letters Patent is hereby corrected as shown below:

Column 14, line 32, after "to", delete "determining".

Column 14, line 38, after "to", delete "halting".

Column 14, line 43, after "to", delete "determining".

Signed and Sealed this

Third Day of August, 2010

David J. Kappos
*Director of the United States Patent and Trademark Office*